United States Patent [19]
Thomaides

[11] 3,824,790
[45] July 23, 1974

[54] CATALYTIC EXHAUST PURIFIER FOR DIESEL ENGINES

[76] Inventor: Lazarus Thomaides, c/o Granlin Corp., Progress Dr., East Cleveland, Ohio 18936

[22] Filed: Mar. 14, 1973

[21] Appl. No.: 341,122

[52] U.S. Cl............ 60/299, 60/295, 60/322, 23/288 F
[51] Int. Cl............................................. F01n 3/14
[58] Field of Search............ 60/299, 322, 295; 23/288 F

[56] References Cited
UNITED STATES PATENTS

| | | | |
|---|---|---|---|
| 3,083,083 | 3/1963 | Boysen | 60/299 |
| 3,094,394 | 6/1963 | Innes | 60/299 |
| 3,255,123 | 6/1966 | Haensel | 60/299 |
| 3,421,826 | 1/1969 | Tope | 23/288 F |
| 3,645,092 | 2/1972 | Tatsutomi | 60/322 |

*Primary Examiner*—Douglas Hart
*Attorney, Agent, or Firm*—Smith, Harding, Earley & Follmer

[57] ABSTRACT

A catalytic exhaust purifier for diesel engines has a housing with means forming an inlet opening substantially centrally in one end of the housing and means forming an outlet opening substantially centrally in the other end of the housing. Within the housing there is a hollow cylindrical catalyst bed having a pair of opposed end walls, inner and outer spaced cylindrical grids secured to said end walls and oxidation catalyst pellets disposed between said grids. One bed end wall is secured to the inlet end of the housing and has a central opening communicating with the inlet opening in the housing. The other bed end wall is spaced from the other end of the housing and the outer cylindrical grid is spaced from the interior of the housing to provide a path for the flow of gas from the outer grid to the outlet opening of the housing. Support members spaced to provide for the passage of gas are fixedly secured to the bed end wall adjacent the outlet opening in the housing and slidably engage the means forming said outlet opening to support the catalyst bed and accommodate the longitudinal expansion and the contraction of the catalyst bed incident to temperature changes.

1 Claim, 4 Drawing Figures

CATALYTIC EXHAUST PURIFIER FOR DIESEL ENGINES

BACKGROUND OF THE INVENTION

Diesel engines mask the catalyst in exhaust purifiers by depositing carbon and fuel on the catalyst and the grids containing the catalyst. Heretofore, catalyst exhaust purifiers for diesel engines have been designed to provide for high temperature cleanup of the grids and catalyst with the purifier remaining in its operating position. This is accomplished with a preheater employing diesel oil and appropriate controls which supply high temperature gases to the purifier. This involves a number of disadvantages. First, it requires from 1/2 hour to 1½ hours once or twice a week for the cleanup. Secondly, the use of diesel fuel makes the preheater difficult to operate with respect to starting and also with respect to preventing overheating of the purifier which possibility requires the employment of more expensive heat resistant materials. The preheater and control panel involve considerable additional expense.

This invention provides an exhaust purifier for diesel engines which is designed to be readily removable while still providing a low pressure drop through the purifier which is necessary when operating with a diesel engine. The ready removal makes it practical to avoid the cleanup operation in situ since the purifier can be readily removed and cleaned up in a suitable oven while a substitute purifier is installed for operation with the diesel engine in question.

SUMMARY OF THE INVENTION

In accordance with this invention, a catalytic exhaust purifier for diesel engines has a housing with an inlet opening substantially centrally in one end and an outlet opening substantially centrally in the other end. A hollow cylindrical catalyst bed has a pair of opposed end walls, inner and outer spaced cylindrical grids secured to said end walls and oxidation catalyst pellets disposed between said grids. One bed end wall is secured to the inlet end of the housing and has a central opening communicating with the inlet opening in the housing. The other bed end wall is spaced from the outlet end of the housing and the outer cylindrical grid is spaced from the interior of the housing to provide a path for the flow of gas from the outer grid to the outlet opening of the housing. Support means with openings for the passage of gas is fixedly secured to the end wall of the bed adjacent the outlet opening of the housing and slidably engages the outlet opening to support the catalyst bed and accommodate the longitudinal expansion and contraction of the catalyst bed incident to temperature changes.

DESCRIPTION OF THE PREFERRED EMBODIMENT

Figure 1:
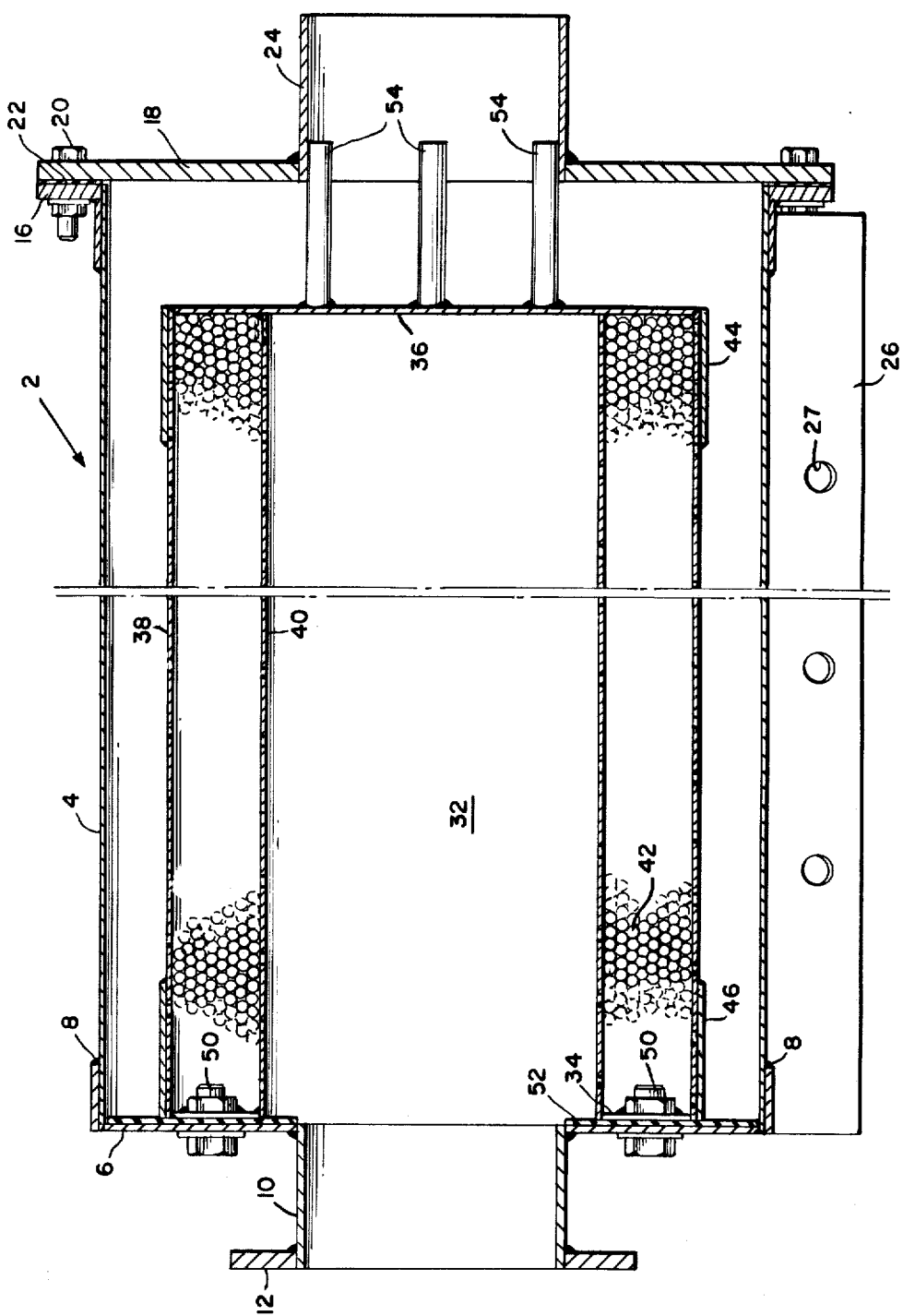
FIG. 1 is a vertical section through an exhaust purifier in accordance with the invention.
Figure 2:
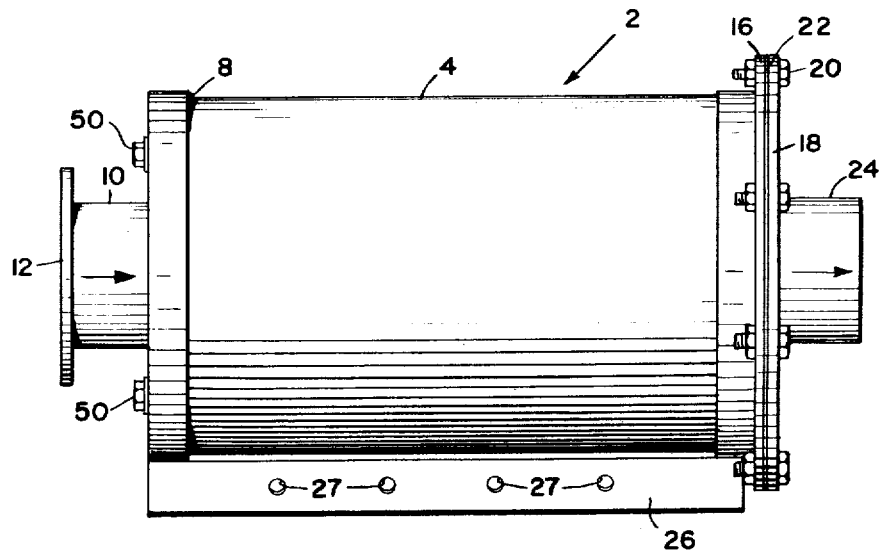
FIG. 2 is a side elevation of the exhaust purifier of FIG. 1.
Figure 3:
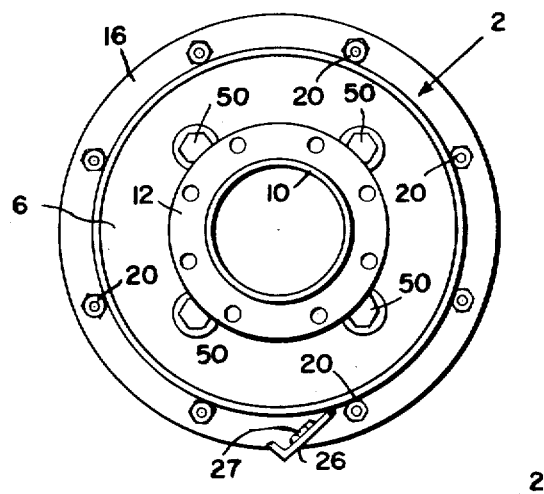
FIG. 3 is an elevation of the inlet end of the exhaust purifier of FIG. 1.
Figure 4:
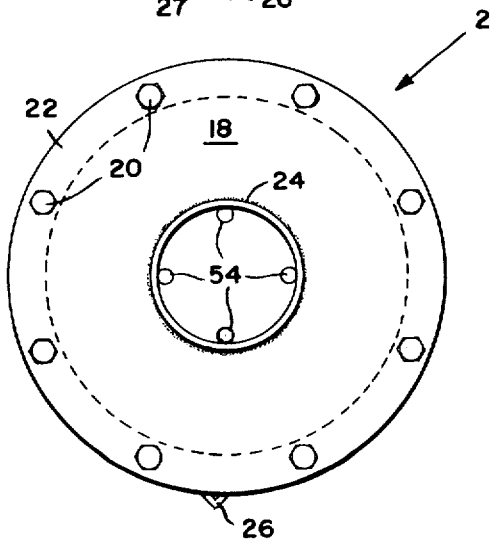
FIG. 4 is an elevation of the outlet end of the exhaust purifier of FIG. 1.

An exhaust purifier 2 has an elongated cylindrical member 4 which is secured to a cap end member 6 as by welding indicated at 8. An inlet pipe member 10 is secured centrally to cap member 6 and has a flanged end 12 for bolting the purifier to a diesel engine exhaust pipe (not shown).

Member 4 has secured thereto a flange 16 to which is secured housing end plate 18 by bolts 20, an asbestos gasket 22 being interposed between flange 16 and plate 18. An outlet pipe 24 is secured centrally to end plate 18.

A securing bar 26 having bolt openings 27 is secured to housing 2 for bolting the housing to a corresponding bar on the structure supporting the diesel engine exhaust system (not shown).

A catalyst bed 32 has a ring end wall 34 and a circular end wall 36 to which walls are fixedly secured as by welding spaced, outer cylindrical foraminous grid 38 and inner foraminous cylindrical grid 40. Catalyst pellets 42 fill the space between grids 38 and 40. Reinforcing rings 44 and 46 are secured to the ends of the outer grid 38.

End wall 34 is bolted to cap end member 6 by bolts 50 with an asbestos gasket 52 interposed between member 6 and wall 34.

Spaced rods 54 are welded to the outside end of wall 36 and slidably engage the interior of outlet pipe 24 to support catalyst bed 32 and accommodate the longitudinal expansion and contraction of the bed due to temperature changes. This arrangement permits the use of relatively large passages for the flow of gases to minimize pressure drop through the purifier.

For cleanup the entire purifier described above is removed and placed in an oven at a temperature of about 900° F for about 1 hour. To avoid down time, a substitute purifier is installed when the purifier to be cleaned up is removed. In this manner the usual preheater and controls are eliminated. Because of the controlled cleanup conditions in the oven, less expensive heat resistant materials may be used in making the purifier such as hot rolled steel for all parts except the grids for which a good grade of heat resistant stainless steel, as conventionally used, is desirable.

Suitable oxidation pellets are well known to the art and hence need not be detailed here. Typical are pellets of activated alumina about 1/8 inch in diameter and impregnated with platinum or palladium.

The above described embodiment is illustrative and is not intended to be limiting.

I claim:

1. A catalytic exhaust purifier for diesel engines comprising:

a housing, means forming an inlet opening substantially centrally in one end of the housing, means forming an outlet opening substantially centrally in the other end of the housing, a hollow cylindrical catalyst bed having a pair of opposed end walls, inner and outer, spaced cylindrical grids secured to said end walls and oxidation catalyst pellets disposed between said grids, means securing one bed end wall to the inlet end of the housing, said one bed end wall having a central opening communicating with the inlet opening in the housing, the other bed end wall being spaced from said other end of the housing and said outer cylindrical grid being spaced from the interior of the housing to provide a path for the flow of gas from the outer grid to the outlet opening in said other end of the housing, and a plurality of spaced rods fixedly secured to said other bed end wall substantially normal thereto and slidably engaging the means forming the outlet opening to support said other bed end wall and accommodate the longitudinal expansion and contraction of the catalyst bed incident to temperature changes.

* * * * *